US009709433B2

(12) United States Patent
Nilsson et al.

(10) Patent No.: US 9,709,433 B2
(45) Date of Patent: Jul. 18, 2017

(54) PULSED RADAR LEVEL GAUGING WITH EFFICIENT START-UP

(71) Applicant: ROSEMOUNT TANK RADAR AB, Gothenburg (SE)

(72) Inventors: Leif Nilsson, Linkoping (SE); Hakan Nyberg, Linkoping (SE); Hakan Delin, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 385 days.

(21) Appl. No.: 14/319,068

(22) Filed: Jun. 30, 2014

(65) Prior Publication Data

US 2015/0377679 A1 Dec. 31, 2015

(51) Int. Cl.
*G01F 23/284* (2006.01)
*G01S 13/88* (2006.01)
(Continued)

(52) U.S. Cl.
CPC .............. *G01F 23/284* (2013.01); *G01S 7/28* (2013.01); *G01S 13/10* (2013.01); *G01S 13/88* (2013.01)

(58) Field of Classification Search
CPC ............... G01F 23/284; G01F 23/0069; G01F 25/0061; G01S 7/28; G01S 13/10; G01S 13/88; G01S 13/103; G01S 7/4004; G01S 13/02; G01S 13/04; G01S 13/08; G01S 13/20; G01S 13/106; G01S 7/292;
(Continued)

(56) References Cited

U.S. PATENT DOCUMENTS 3,202,988 A * 8/1965 Fombonne ............ G01S 13/106
324/76.43
4,524,360 A * 6/1985 Bergman ................ G01S 7/292
342/192
(Continued)

FOREIGN PATENT DOCUMENTS

CN 203287081 U 11/2013
DE 1562051 A2 * 8/2005 ........... G01F 23/284
(Continued)

OTHER PUBLICATIONS

European Search Report from European Application No. 15173944.8, dated Nov. 27, 2015.

*Primary Examiner* — Timothy A Brainard
*Assistant Examiner* — Nuzhat Pervin
(74) *Attorney, Agent, or Firm* — Westman, Champlin & Koehler, P.A.

(57) ABSTRACT

A method for powering a radar level gauge, comprising an initial frequency stabilization procedure, ensuring a stable separation frequency between a first and a second clock frequencies, during which frequency stabilization procedure said radar level gauge is not powered to provide a level output, and a subsequent measurement cycle, performed only when a stable separation frequency has been established, during which said radar level gauge is powered to provide a level output. The present invention allows a radar level gauge system to save power by not providing power to and operating the radar level gauge circuit during such times when the frequency separation would not enable the radar level gauge to provide proper level measurements.

21 Claims, 3 Drawing Sheets

(51) Int. Cl.
*G01S 7/28* (2006.01)
*G01S 13/10* (2006.01)

(58) Field of Classification Search
CPC ........ G01S 13/003; G01S 7/285; G01S 13/18;
G01S 7/4056; G01S 7/02; G01S 13/36;
G01S 7/4008; G01S 13/76; H01Q 1/225;
H01H 71/0264; H02J 9/02; B01J 8/0015;
H03K 5/133
USPC .......................................................... 342/124
See application file for complete search history.

(56) References Cited

U.S. PATENT DOCUMENTS

| | | | | |
|---|---|---|---|---|
| 5,847,567 A * | 12/1998 | Kielb | ................... | G01F 23/284 324/642 |
| 6,049,302 A * | 4/2000 | Hinckley, Jr. | ......... | G01S 13/003 342/101 |
| 6,842,139 B1 * | 1/2005 | Nilsson | ................... | G01S 7/285 342/124 |
| 7,109,916 B2 * | 9/2006 | Klinnert | ................ | G01S 13/003 342/134 |
| 7,233,279 B2 * | 6/2007 | Moriya | ................... | G01S 13/18 342/134 |
| 7,304,601 B1 * | 12/2007 | Edvardsson | .......... | G01F 23/284 342/118 |
| 7,525,476 B1 * | 4/2009 | Delin | ................... | G01S 7/4056 324/600 |
| 7,586,435 B1 * | 9/2009 | Edvardsson | .......... | G01F 23/284 324/600 |
| 8,742,978 B2 * | 6/2014 | Gierlich | ................ | G01S 13/767 342/125 |
| 9,234,784 B2 * | 1/2016 | Jirskog | ................ | G01F 23/284 |
| 9,291,443 B2 * | 3/2016 | Kleman | ................ | G01S 7/35 |
| 9,389,113 B2 * | 7/2016 | Jirskog | ................ | G01F 23/284 |
| 9,395,229 B2 * | 7/2016 | Jirskog | ................ | G01F 23/284 |
| 2004/0080324 A1 * | 4/2004 | Westerling | ............ | G01F 23/284 324/644 |
| 2004/0119636 A1 * | 6/2004 | Edvardsson | .......... | G01F 23/284 342/124 |
| 2006/0273949 A1 * | 12/2006 | Nilsson | ................ | G01F 23/284 342/124 |
| 2008/0105048 A1 * | 5/2008 | Nilsson | ................ | G01F 23/284 73/290 V |
| 2008/0150789 A1 * | 6/2008 | Jirskog | ................ | G01F 23/284 342/124 |
| 2009/0315758 A1 * | 12/2009 | Jirskog | ................ | G01F 23/284 342/124 |
| 2009/0322593 A1 * | 12/2009 | Hall | ...................... | G01F 23/284 342/124 |
| 2010/0085671 A1 * | 4/2010 | Allalouf | ............ | H01H 71/0264 361/42 |
| 2010/0123614 A1 * | 5/2010 | Nilsson | ................... | G01S 7/02 342/124 |
| 2010/0156702 A1 * | 6/2010 | Edvardsson | .......... | G01F 23/284 342/124 |
| 2011/0093129 A1 * | 4/2011 | Nilsson | ................ | G01F 23/284 700/295 |
| 2011/0133655 A1 * | 6/2011 | Recker | ...................... | H02J 9/02 315/159 |
| 2011/0140951 A1 * | 6/2011 | Nyberg | ............... | G01F 23/0069 342/124 |
| 2012/0010838 A1 * | 1/2012 | Wenger | ................. | G01F 23/284 702/89 |
| 2012/0056774 A1 * | 3/2012 | Wennerberg | .......... | G01F 23/284 342/124 |
| 2012/0169528 A1 * | 7/2012 | Edvardsson | .......... | G01F 23/284 342/124 |
| 2012/0242532 A1 * | 9/2012 | Fouarge | ................. | B01J 8/0015 342/124 |
| 2012/0274500 A1 * | 11/2012 | Nyberg | ................. | G01F 23/284 342/124 |
| 2013/0009803 A1 * | 1/2013 | Edvardsson | .......... | G01F 23/284 342/124 |
| 2013/0057425 A1 * | 3/2013 | Wenger | ................. | H03K 5/133 342/124 |
| 2013/0057426 A1 * | 3/2013 | Wenger | ................. | H03K 5/133 342/124 |
| 2013/0076559 A1 * | 3/2013 | Edvardsson | ............ | G01S 13/36 342/124 |
| 2013/0076560 A1 * | 3/2013 | Edvardsson | .......... | G01F 23/284 342/124 |
| 2013/0300595 A1 * | 11/2013 | Hemmendorff | ........... | G01S 7/28 342/124 |
| 2013/0333465 A1 * | 12/2013 | Nilsson | ..................... | G01S 7/28 73/290 V |
| 2013/0335262 A1 * | 12/2013 | Nilsson | ............... | G01F 23/0069 342/124 |
| 2014/0002274 A1 * | 1/2014 | Nilsson | ................. | G01F 23/284 340/870.02 |
| 2014/0005959 A1 * | 1/2014 | Nilsson | ................. | G01S 7/4008 702/55 |
| 2014/0083183 A1 * | 3/2014 | Edvardsson | ........ | G01F 25/0061 73/290 V |
| 2014/0085130 A1 * | 3/2014 | Edvardsson | .......... | G01F 23/284 342/124 |
| 2014/0085132 A1 * | 3/2014 | Jirskog | ................. | G01F 23/284 342/124 |
| 2014/0266862 A1 * | 9/2014 | Fredriksson | .......... | G01F 23/284 342/124 |
| 2014/0266864 A1 * | 9/2014 | Fredriksson | .......... | G01F 23/284 342/124 |
| 2015/0009063 A1 * | 1/2015 | Korsbo | ................. | G01F 23/284 342/124 |
| 2015/0177044 A1 * | 6/2015 | Edvardsson | .......... | G01F 23/284 342/124 |
| 2015/0226594 A1 * | 8/2015 | Frovik | ................. | G01F 23/284 342/124 |
| 2015/0253175 A1 * | 9/2015 | Jirskog | ................. | G01F 23/284 342/58 |
| 2015/0253176 A1 * | 9/2015 | Jirskog | ................. | G01F 23/284 342/58 |
| 2015/0330825 A1 * | 11/2015 | Nilsson | ..................... | G01S 7/28 702/55 |
| 2015/0377678 A1 * | 12/2015 | Edvardsson | .......... | G01F 23/284 342/124 |
| 2016/0103006 A1 * | 4/2016 | Edvardsson | ........ | G01S 13/0209 342/124 |
| 2016/0153821 A1 * | 6/2016 | Nilsson | ................. | G01F 23/284 342/124 |

FOREIGN PATENT DOCUMENTS

| | | | |
|---|---|---|---|
| EP | 1562051 A2 * | 12/2004 | ............ G01S 13/10 |
| EP | 1 562 051 | 10/2005 | |
| WO | 01/02819 A1 | 1/2001 | |

* cited by examiner

PULSED RADAR LEVEL GAUGING WITH EFFICIENT START-UP

FIELD OF THE INVENTION

The present invention relates to the field of radar level gauge systems using pulsed measurements. In particular, the present invention relates to power management within a radar level gauge system.

BACKGROUND OF THE INVENTION

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the frequency difference between a transmitted frequency-modulated signal and its reflection at the surface. The latter types of systems are generally referred to as being of the FMCW (Frequency Modulated Continuous Wave) type.

For pulsed radar level gauge systems, time expansion techniques are generally used to resolve the time-of-flight.

Such pulsed radar level gauge systems may have a first oscillator for generating a transmission signal formed by pulses for transmission towards the surface of the product contained in the tank with a transmitted pulse repetition frequency $f_t$, and a second oscillator for generating a reference signal formed by reference pulses with a reference pulse repetition frequency $f_{ref}$ that differs from the transmitted pulse repetition frequency by a given frequency difference $\Delta f$. This frequency difference $\Delta f$ is typically in the range of Hz or tens of Hz.

At the beginning of a measurement sweep, the transmission signal and the reference signal are usually synchronized to have the same phase. Due to the frequency difference $\Delta f$, the phase difference between the transmission signal and the reference signal will gradually increase during the measurement sweep. During the measurement sweep, the reflection signal resulting from reflection of the transmission signal at the surface of the product contained in the tank is being correlated with the reference signal, so that an output signal is only produced when a reflected pulse and a reference pulse occur at the same time. The time from the start of the measurement sweep to the occurrence of the output signal resulting from the correlation of the reflection signal and the reference signal is a measure of the phase difference between the transmission signal and the reflection signal, which is in turn a time expanded measure of the time-of-flight of the reflected pulses, from which the distance to the surface of the product contained in the tank can be determined.

The aforementioned synchronization of the transmission signal and the reference signal requires regulation to be within acceptable parameters. WO 01/02819 describes a frequency regulator for creating and synchronizing transmit and sample clocks. A controller feeds back a control output to the clock source, and this feedback is used to stabilize a first frequency separation between first and second clock frequencies, so that the radar gauge circuit generates a level output that is stabilized and also corrected as a function of the frequency separation.

However, current radar level gauge systems are still power hungry and it is hard to meet safety requirements regarding power usage and energy storage. Further, recent developments in the field of radar level gauging call for more stand alone functionality and systems being capable of operating in far away and remote sites where power limitations can be more severe, e.g. the systems cannot be supplied by the grid. Hence, there is a need to minimize the power used in radar level gauges, and further to provide a radar level gauge which is able to operate independently and provide a larger amount of functionality either on-site or off-site by providing more measurements at a lower total energy cost. Even further, there is a need to meet the above mentioned safety regulations limiting the amount of energy which is allowed to be stored due to inherent hazards such as the material in the storage tanks being highly flammable etc.

GENERAL DISCLOSURE OF THE INVENTION

It is therefore an object of the present invention to provide a more energy efficient pulsed radar level gauge.

The invention is based on a realization that advantages are achieved by a new way of handling the power management in a radar level gauge using pulsed measurements. When the radar level gauge is started, power is only sent to a part of the system comprising the frequency generating circuitry, a frequency regulator and a frequency separation evaluation circuit. When the frequency separation between the first and the second clock source is correct, power is sent to the rest of the system to transmit radar signals and generate the level output. Thereby, parts of the system used for radar transmission and signal handling are only powered when level measurements are possible.

According to a first aspect of the present invention, these and other objects are achieved by a pulsed radar level gauge system for measuring the distance to a surface of a material contained in a tank, which comprises frequency generating circuitry, adapted to generate a first clock frequency and a second clock frequency, and a frequency regulator configured to control a frequency separation between the first and second clock frequencies towards a frequency separation set-point. The system also comprises a frequency separation evaluation circuit arranged to generate a power-up signal when the frequency separation is within a predefined frequency range. Further, the system comprises a radar level gauge circuit configured to generate a transmit signal in the form of a pulse train with a transmit pulse repetition frequency based on the first clock frequency and generate a reference signal in the form of a pulse train with a reference pulse repetition frequency based on the second clock frequency, transmit the transmit signal towards the surface, receive a return signal caused by a reflection of the transmit signal at the surface, and provide a level output based on a relationship between the return signal and the reference signal. The system further comprises power management circuitry configured to, in absence of the power-up signal, not power the radar level gauge circuit to provide a level output, and in presence of the power-up signal, power the radar level gauge circuit to provide a level output.

According to a second aspect of the present invention, the objectives are also achieved by a method for measuring the distance to a surface of a material contained in a tank. The method comprises the steps of generating a first clock frequency and a second clock frequency, controlling a frequency separation to ensure a predefined frequency separation between the first and second clock frequencies. The method further comprises the step of generating a power-up signal when the frequency separation is within a predefined frequency range. In absence of the power-up signal, not powering a radar level gauge circuit, and in presence of the power-up signal, powering the radar level gauge circuit, thereby enabling the radar level circuit to generate a transmit signal in the form of a pulse train with a transmit pulse repetition frequency based on the first clock frequency and generate a reference signal in the form of a pulse train with a reference pulse repetition frequency based on the second clock frequency, transmit the transmit signal towards the surface, receive a return signal caused by a reflection of the transmit signal at the surface, and provide a level output based on a relationship between the return signal and the reference signal.

According to a third aspect of the present invention, the objectives are also achieved by a method for powering a radar level gauge, comprising an initial frequency stabilization procedure, ensuring a stable separation frequency between a first and a second clock frequencies, during which frequency stabilization procedure the radar level gauge is not powered to provide a level output, and a subsequent measurement cycle, performed only when a stable separation frequency has been established, during which the radar level gauge is powered to provide a level output.

Hence, the present invention allows a radar level gauge system to save power by not providing power to and operating the radar level gauge circuit during such times when the frequency separation would not enable the radar level gauge to provide proper level measurements. The expression "not provide power" should, in the context of the present invention, be construed as providing none or insufficient power for the radar level gauge circuit to be able to perform a measurement and/or provide a level output. Thereby, significant power savings can be made while the frequency separation is stabilized.

In other words, there is in essence at least two different operating modes of the radar level gauge system; one preparatory mode, where the level measurement is not enabled, i.e. there is no radar transmission; and one active mode where level measurement is enabled, i.e. radar transmission and level sampling is performed to measure the distance to a surface of a material contained in a tank. In the present invention, the radar level gauge system is arranged such that as few components and functions as possible are powered in the preparatory mode, i.e. that only those components that are necessary for achieving correct and accurate timing of the first and second clock frequencies are active and powered in the preparatory phase.

Another advantage of the present invention is that energy consuming signal handling and processing to correct the level measurement due to an unstable or incorrect frequency separation will not be needed or at least minimized.

It should be noted that the frequency separation normally is in the order of Hz, e.g. around 4 Hz. Using a conventional feedback regulator, the regulation frequency will be in the same order, and it will therefore typically take several seconds to ensure a stable frequency separation. A measurement cycle is typically much shorter, in the order of ms, and there will thus be a number of measurement cycles which do not provide a level measurement until the frequency separation is properly stabilized. With the present invention, the power which would be used for those measurements can be saved and thereby a more power efficient radar level gauge system is provided with a number of inherent advantages.

Even in cases where a more time efficient frequency regulation is employed, the power savings provided by the present invention can be important.

The advantages of the invention are particularly important in situations where available power is scarce, such as for a radar level gauge system without any connection to a remote power supply, and having a local energy store (e.g. a battery) as only means to provide power. To keep the maintenance cost of the level gauge system down, battery life should be as long as possible, preferably in the order of several years or even up towards a decade. This means that it is important to design the level gauge system for a very low average energy consumption, without compromising the performance of the level gauge system in terms of, for example, accuracy and ability to monitor changes in the tank. In other words, one advantage related to this way of handling the power management is a lowered energy consumption which in turn enables a battery powered radar level gauge system to operate for a longer period of time without depleting the battery.

A simple way to evaluate the frequency separation is to detect it directly. For example, the frequency separation evaluation circuit may be configured to compare a detected frequency separation to a predefined threshold value in order to determine a good timing of said frequency separation. Herein, the term "good timing of the frequency separation" refers to that the frequency separation is sufficiently stable over time and/or that the frequency separation is sufficiently small. When a good timing of the frequency separation has been determined, the frequency separation evaluation circuit will generate the power-up signal in order to activate more parts of the system.

Another way to evaluate the frequency separation is to detect a condition of the frequency regulator. For example, an error signal indicative of a difference between a current frequency separation and the predefined frequency separation can be used to evaluate when the frequency separation is stable.

The frequency separation evaluation circuit and the power management circuitry may be comprised in a single low power circuit separate from said radar level gauge circuit. Thereby, the circuits and components needed for the frequency stabilization phase are efficiently separated from the circuits and components used during the measurement phase. The low power circuit may thus be a stand-alone low power FPGA solution or a small micro control unit. Such units are per se known to the person skilled in the art and are cheap and durable.

Further, the frequency separation evaluation circuit may be configured to be inactive during measurements by the radar level gauge circuit. Such a solution will allow for a simple and efficient separation of power division e.g. power management by bypassing the separate low power circuit when applicable, i.e. when measurements are performed. The peak power usage during level measurement may be decreased by not activating the circuit and components used during the preparatory phase. Moreover, the power management circuitry may provide power to the radar level gauge circuit for a plurality of consecutive measurements.

In one embodiment of the invention, the transmit signal and reference signal are DC pulse trains. In another embodiment of the invention, the pulses in the transmit signal and reference signal are frequency modulated and the system comprises a mixer for mixing the return signal with the reference signal, to provide the tank signal. Thereby, it should be understood that the present invention is applicable to both DC pulsed measurements and frequency modulated pulsed measurements.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an embodiment of the invention.

DETAILED DESCRIPTION OF THE PREFERRED EMBODIMENTS

In the present detailed description, various embodiments of the level gauge system according to the present invention are mainly discussed with reference to a pulsed radar level gauge system of the non-contact type, in which an electromagnetic signal is propagated towards the product contained in the tank using a propagating device in the form of a radiating antenna, such as a cone antenna, a horn antenna, an array antenna or a patch antenna.

It should be noted that this by no means limits the scope of the present invention, which is equally applicable to a pulsed guided wave radar (GWR) level gauge system utilizing a propagating device in the form of a transmission line probe, such as a single line probe (including a so-called Sommerfeld or Goubau probe), a two-lead probe, a coaxial probe, etc.

Figure 1:
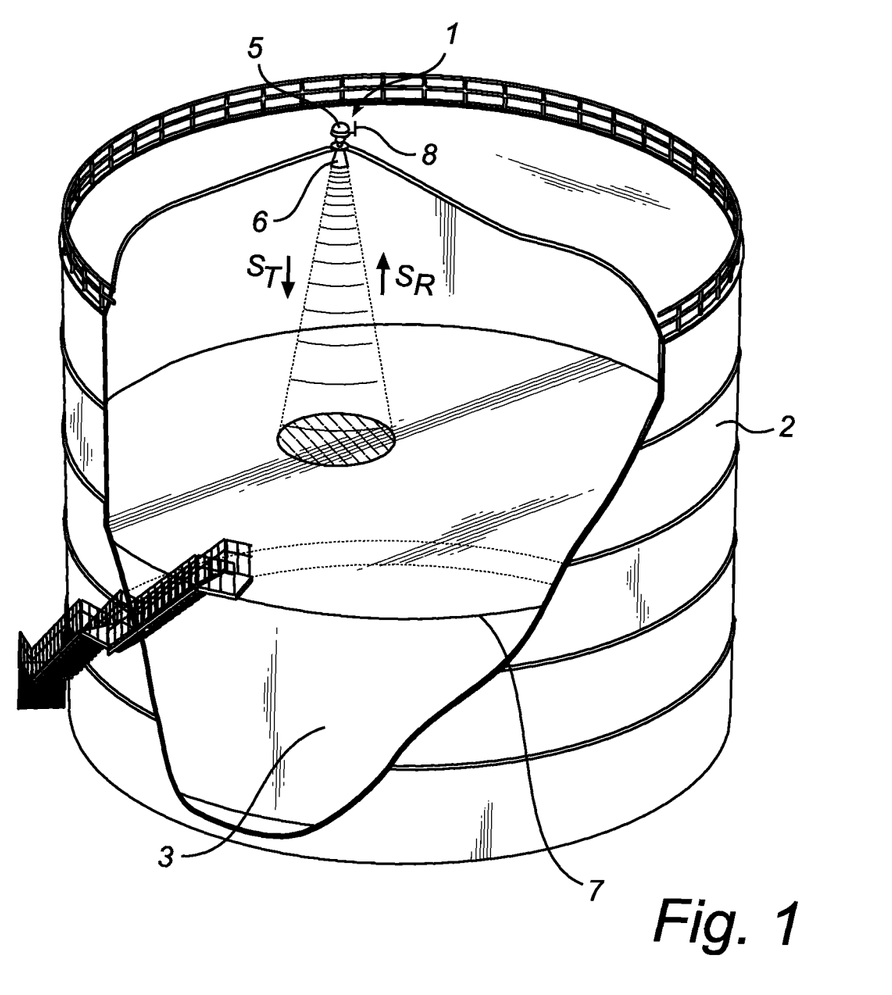
FIG. 1 is a schematic representation of a radar level gauge system for pulsed measurement according to a first embodiment of the present invention.

FIG. 1 schematically illustrates a level gauge system 1 arranged on top of a tank 2 for determining the filling level of a product 3 contained in the tank 2 using microwaves. The level gauge system 1 is therefore in the following referred to as a radar level gauge system or an RLG-system.

The radar level gauge system 1 comprises a measurement unit 5, a propagating device, here in the form of a horn antenna 6 for propagating microwaves towards a surface 7 of the product 3 contained in the tank 2, and a communication antenna 8 for allowing wireless communication with a remote device.

When measuring the filling level of the product 3 contained in the tank 2, the radar level gauge system 1 transmits an electromagnetic transmission signal $S_T$ by the antenna 6 towards the surface 7 of the product 3, where the signal is reflected as a surface echo signal $S_R$. The distance between a reference position at the top of the tank 2 and the surface 7 of the product 3 is then determined based on the time-of-flight of the surface echo signal $S_R$ (from the radar level gauge system 1 to the surface 7 and back). From this distance and known dimensions of the tank 2, the filling level can be deduced.

It should be noted that, although a tank 2 containing a single product 3 is discussed herein, the distance to any material interface present in the tank 2 can be measured in a similar manner.

As is schematically illustrated in FIG. 1, the exemplary level gauge system 1 is configured to communicate with external devices, such as a remote control center, using wireless data transmission. For different applications, this may be advantageous, as wiring for communication may often represent a significant part of the cost for installing a level gauge system. A level gauge system 1 configured for wireless communication may often also be required to receive power from a local energy store, such as a battery or similar (not shown). To keep the maintenance cost of the level gauge system 1 down, battery life should be as long as possible, preferably in the order of several years or even up towards a decade. This means that it is important to design the level gauge system 1 for a very low average energy consumption, without compromising the performance of the level gauge system 1 in terms of, for example, accuracy and ability to monitor changes in the tank 2. This is not only of importance for a wireless level gauge system 1, but also for a level gauge system with other restrictions imposed on its supply of electrical power/energy. An example of such a radar level gauge system is a radar level gauge system that is powered through the communication lines, such as a so-called two-wire radar level gauge, that communicates and receives electrical energy via a two-wire 4-20 mA current loop.

Figure 2:
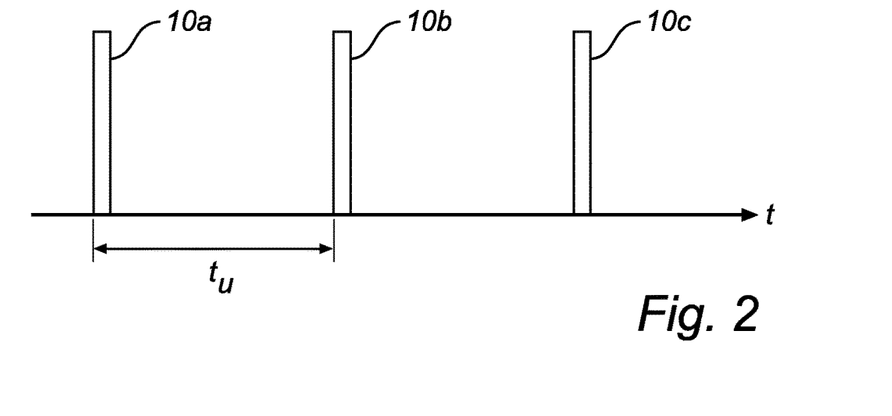
FIG. 2 is a schematic representation of the measurement electronics of FIG. 1.

A widely used scheme for handling situations where the average energy consumption is important is schematically illustrated in FIG. 2. As is indicated in FIG. 2, filling level determination events 10a-c are separated in time, and between these filling level determination events 10a-c, the level gauge system 1 is in a sleep mode, where parts of the level gauge system that are used to determine the filling level may be turned off. This scheme is often referred to as intermittent operation, and the time $t_u$ between the filling level determination events defines an update frequency. The update frequency can differ for different types of implementations, for a radar level gauge system with no practical limitations to energy provision such as a system being supplied with energy/power by grid electricity the update frequency can be as high as once per second. For a system with severe limitations such as a tank placed in a remote location, without any remote power supply only being powered by a local energy store such as a battery, the update frequency can be lower e.g. once per minute or once per 10 minutes or the update frequency can be even lower such as once per hour or once per day (24 hour cycle). It should be noted that the design of a radar level gauge system with limited amounts of energy will often be dependent on the required update frequency for the application at hand. For example, harsher safety demands may require a higher update frequency or the update frequency may be set higher by an operator of the system requiring quicker updates of the filling level. It should be noted that the limitations can also be imposed due to a low amount of available energy/power for a radar level gauge system being powered by other sources, e.g. a hydrogen fuel cell or a photovoltaic solar cell.

As a further means for reducing the average energy consumption of the radar level gauge system 1, the various aspects of the present invention provide for efficient start-up of parts of the radar level gauge system in order to conserve power until actual measurements occur. This will be described in further detail below with reference to FIGS. 3 and 4.

Figure 3:
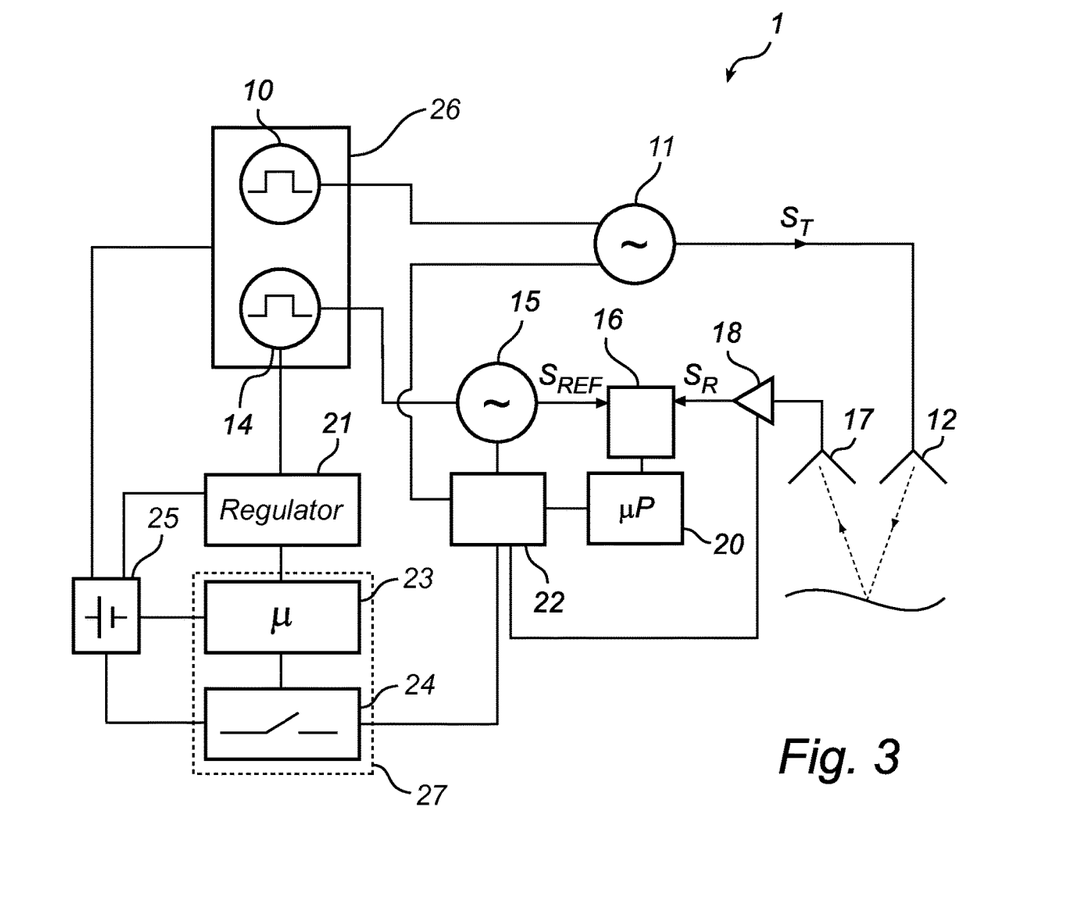
FIG. 3 is a schematic representation of the measurement electronics according to another embodiment of the invention.

FIG. 3 is a block diagram schematically showing functional components comprised in the level gauge system in FIG. 1. The exemplary level gauge system 1 comprises a transmitter branch and a receiver branch generally understood to be a radar level gauge circuit.

A frequency generating circuitry 26 is configured to generate a first and a second clock frequency, used to generate a transmit pulse train and a reference pulse train. In the illustrated example, the frequency generating circuitry comprises a transmit pulse generator 10 for generating a transmit pulse train. The pulse repetition frequency of the transmit pulse train is here equal to the first clock frequency. The frequency generating circuitry further comprises a reference pulse generator 14, for generating a reference pulse train. The pulse repetition frequency of the reference pulse train is here equal to the second clock frequency. The transmit pulse generator 10 and the reference pulse generator 14 are typically voltage controlled oscillators, and may be e.g. crystal oscillators. If higher pulse repletion frequencies are required than the oscillators generate, additional circuitry may be provided to multiply the first and second clock frequencies. The pulse repetition frequencies are typically in the order of MHz. It should also be noted that the pulses are very short, on the order of nanoseconds.

The transmitter branch further comprises a first RF-source 11, and a transmitting antenna 12, and the receiver branch further comprises a second RF-source 15, mixing circuitry 16, and a receiving antenna 17. The receiver branch further comprises a low noise amplifier 18 for amplifying the signals received by the receiving antenna 17. In most applications, the receiving antenna 17 and the transmitting antenna 12 are embodied as one single antenna.

In the transmitter branch, the pulses provided by the transmission pulse generator 10 are modulated by the first RF-source 11 to form a transmit signal $S_T$ in the form of a sequence of transmission pulses (short "packets" of microwave energy) which is radiated towards the surface 7 of the product by the transmitting antenna 12. The modulation frequency is typically in the order of GHz.

In the receiver branch, the pulses provided by the reference pulse generator 14 are modulated by the second RF-source 15 to form a reference signal $S_{REF}$. The reflected signal $S_R$ is received by the receiving antenna 17 and is, following amplification in the low noise amplifier 18, forwarded to the mixing circuitry 16. The mixing circuitry 16 is also provided with the reference signal $S_{REF}$.

As will be elaborated on further below, the transmit pulse generator 10 and the reference pulse generator 14 generate pulses with slightly different pulse repetition frequencies. The difference frequency $\Delta f$ between the transmit pulse repetition frequency and the reference pulse repetition frequency may be in the order of Hz or tens of Hz.

The pulses of the transmit signal $S_T$ and the pulses of the reference signal $S_{REF}$ may advantageously be in phase at the start of a measurement sweep so that the time until there is correlation between the reference signal $S_{REF}$ and the reflected signal $S_R$ together with the difference frequency $\Delta f$ can be used to determine the time-of-flight of the reflected signal $S_R$. The time-of-flight is then used to determine the filling level.

In the mixing circuitry 16, the reference signal $S_{REF}$ and the reflected signal $S_R$ are time correlated to form a tank signal $S_m$, which is provided to the microprocessor 20, where the distance to the surface 7 of the product 6 is determined based on the measurement signal $S_m$. The "sampling" performed in the mixing circuitry 16 is sometimes referred to as "hardware sampling" and should not be confused with the sampling done during the subsequent signal processing. The details of the sampling done in the mixing circuitry 16 further depend on the type of pulses.

The return signal is mixed with the reference signal in a mixer. In case of DC pulses, i.e. without the high frequency modulation introduced by the RF-sources 11 and 15, the output from the mixer is then simply provided to a sample-and-hold circuit. In the illustrated example, with high frequency modulated pulses, the mixing will provide an intermediate frequency (IF) signal. This signal may be filtered by a band-pass filter to suppress noise and then be provided to an envelope detector. The output from the envelope detector can be provided to a sample-and-hold circuit.

In either case, the resulting tank signal is a (piece-wise constant) time expanded echo signal which is provided to the microprocessor 20 for further sampling and processing. Hence, it is understood that the present invention is applicable to pulsed radar level gauge systems using either DC pulses or frequency modulated pulses, and modifications and details regarding the specific components such as circuitry for generating the frequency modulation and sampling thereof is known to those skilled in the art and will be chosen according to the design or construction the system 1.

The level gauge system further comprises a frequency regulator 21, which is connected to the frequency generating circuitry 26, for controlling the timing of the transmit pulse generator 10 and the reference pulse generator 14. More specifically, the frequency regulator controls a frequency separation between the first and second clock frequencies towards a frequency separation set-point. Examples of frequency regulation are disclosed in WO 01/02819, hereby incorporated by reference.

The frequency regulator 21 is also connected to a frequency separation evaluation circuit 23 which is arranged to generate a power-up signal when said frequency separation is within a predefined frequency range, i.e. the frequency difference $\Delta f$. The radar level gauge system 1 also comprises a power management circuitry 24 configured to provide power to the radar level gauge circuit, i.e. transmitter and receiver branch, in response to a power-up signal from the frequency separation evaluation circuit 23.

Referring again to FIG. 3, the level gauge system 1 additionally comprises a power source 25 connected to the frequency generating circuitry 26, the frequency regulator 21, the frequency separation evaluation circuit 23 and the power management circuitry 24. The power source 25 could be a 4-20 mA control loop or a battery as discussed above. Note that the power source 25 can be the sole provider of power for the system and no remote power is present, such as in the case of a battery.

In absence of the power-up signal, the power management circuitry 24 is configured to not power the radar level gauge circuit to provide a level output. In presence of the power-up signal, the power management circuitry 24 is configured to power the radar level gauge circuit to provide a level output. The power management circuitry 24 is further connected to a power distribution unit 22, and the power distribution unit 22 is connected to the microprocessor 20, and to various parts of the level gauge system 1 for supplying power during measurement to those components comprised in the radar level gauge circuit. In the exemplary embodiment that is schematically illustrated in FIG. 3, the power distribution unit 22 is connected to the first RF-source 11, the second RF-source 15 and the low noise amplifier 18 between the receiving antenna 17 and the sampling circuitry 16.

These components in principle need only be fully active at a time corresponding to when the frequency separation is correct, i.e. sufficiently stable or small as to make level measurements possible. The energy consumption of the radar level gauge system 1 can thus be reduced through the use of the frequency separation evaluation circuit 23 controlling the power management circuitry 24 by a power-up signal which in turns controls the supply of power to the power distribution unit 22 which distributes power to components comprised in the radar level gauge circuit.

It should also be noted that the peak power usage can be further reduced by inactivating the frequency separation evaluation circuit 23 during measurements. The frequency separation evaluation circuit 23 controlling the power-up circuit 24 can then be comprised in a single low power circuit 27 separate from the radar level gauge circuit. The single low power circuit 27 could be any type of stand-alone circuitry such as an FPGA or small MCU.

Note that while the elements of the power distribution unit 22 and the microprocessor 20 are shown as separate units typically implemented in hardware, they can also form part of an integrated unit. At least some portions of the microprocessor 20 are typically embodied by software modules executed by an embedded processor. The invention is not restricted to this particular realization, and any implementation found suitable to realize the herein described functionality may be contemplated.

Hence, in use, during a start-up of the radar level gauge 1, after being inactive such as between the filling level determination events 10a-c, power is supplied by the power source 25 to the frequency generating circuitry 26, the frequency regulator 21, the frequency separation evaluation circuit 23 and the power-up circuitry 24. The frequency generating circuitry 26 is controlled by the frequency regulator 21 to achieve a correct frequency separation and the frequency separation evaluation circuit 23 will monitor the frequency separation. After a sufficient amount of regulation attempt by the frequency regulator 21 the frequency separation is acceptable and the frequency separation evaluation circuit 23 will then generate a power-up signal to the power-up circuitry 24, which will then send power to the power management circuit 22 which will enable level measurements by the radar level circuit as described above in conjunction with FIG. 1.

After determining the distance to the surface 7 of the product 6 the microprocessor 20 will then typically send that data through a connection with the 4-20 mA control loop (not shown) or through above discussed wireless connections (not shown). As an alternative, the level measurement may also be shown on an indicator locally and thus also possibly stored locally in some sort of digital storage means (not shown).

An alternative to further reduce the peak power usage of the frequency regulator 21 can be configured not provide any regulation during measurements. The control signals applied to the transmission pulse generator 10 and the reference pulse generator 14 will then remain constant, and the pulse generators will continue to provide the same frequencies. In other words, the Q-value of the transmission pulse generator 10 and the reference pulse generator 14 need to be high enough for one or several measurements without continuous regulation from the frequency regulator 21.

An additional alternative to further reduce the power usage of the radar level gauge system comprises configuring power management circuitry 24 and the power distribution unit 22 to, as soon as a measurement is performed and received, shut off power to all components except the microprocessor 20 until the level output has been sent or stored. After the level output has been sent or stored, as is described above, power is also shut off from the microprocessor 20.

Figure 4:
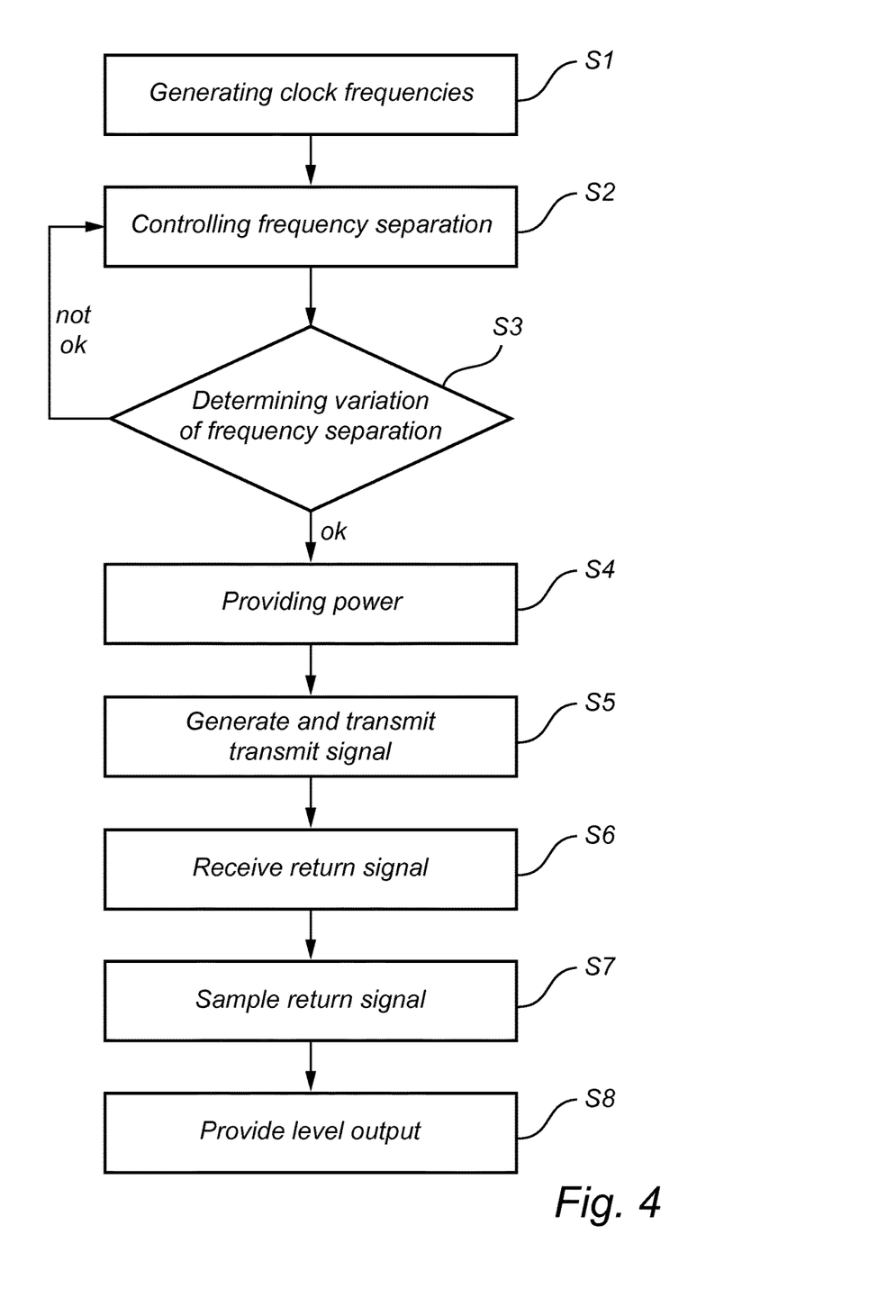
FIG. 4 is a flowchart of a method according to one embodiment of the present invention.

Referring now to FIG. 4, which is a flow chart showing steps of an exemplary method according to the invention a first step S1 comprises generating a first clock frequency and a second clock frequency. A second step S2 comprises controlling a frequency separation to ensure a predefined frequency separation between the first and second clock frequencies.

Then, in a third step S3 a power-up signal is generated when the frequency separation is within a predefined frequency range. If the frequency separation is not within the predefined frequency range, the method will return to step S2 and continue to control the frequency separation. If the frequency separation is within the predefined frequency range, the power-up signal is generated.

Steps S1-S3 can be referred to as an initial frequency stabilization procedure which ensures a stable separation frequency.

In a fourth step S4, a radar level gauge circuit is powered if the power up signal is present. Hence, in the absence of said power-up signal, the radar level gauge circuit is not powered and in the presence of the power-up signal power is provided to the radar level gauge circuit.

The power provided to the radar level gauge circuit will in a fifth step S5 enable the radar level gauge circuit to generate and transmit a transmit signal $S_T$ towards said surface. The transmit signal $S_T$ being a pulse train with a transmit pulse repetition frequency based on said first clock frequency. The transmit signal $S_T$ is transmitted towards the surface 7 of the product 3 contained in the tank 2. In a sixth step S6, a reflected return signal $S_R$ resulting from reflection of the transmission signal $S_T$ at the surface 7 is received.

In a seventh step S7, the return signal $S_R$ is time correlated with a reference signal in the form of a pulse train with a reference pulse repetition frequency based on the second clock frequency. The result is a time expanded measurement signal $S_m$. Finally in an eight step S8, the filling level is determined based on the measurement signal $S_m$ and provided as a level output.

Steps S4-S8 can be referred to as a measurement cycle, performed only when a stable separation frequency has been established.

It is noted that the invention has mainly been described above with reference to a few embodiments. However, as is readily appreciated by a person skilled in the art, other embodiments than the ones disclosed above are equally possible within the scope of the invention, as defined by the appended claims.

Although the figures may show a specific order of method steps, the order of the steps may differ from what is depicted. Also two or more steps may be performed concurrently or with partial concurrence. Such variation will depend on the software and hardware chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. For example, the communication process of the level measurement result is one example the skilled addressee and person skilled in the art will easily understand that any suitable communication protocol and device may be contemplated. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A pulsed radar level gauge system for measuring the distance to a surface of a material contained in a tank, said system comprising:
   frequency generating circuitry, adapted to generate a first clock frequency and a second clock frequency;
   a frequency regulator configured to control a frequency separation between the first and second clock frequencies towards a frequency separation set-point;
   a frequency separation evaluation circuit arranged to generate a power-up signal when said frequency separation is within a predefined frequency range;
   a radar level gauge circuit configured to:
      generate a transmit signal in the form of a pulse train with a transmit pulse repetition frequency based on said first clock frequency,
      generate a reference signal in the form of a pulse train with a reference pulse repetition frequency based on said second clock frequency,
      transmit said transmit signal towards said surface,
      receive a return signal caused by a reflection of said transmit signal at said surface,
      provide a level output based on a relationship between said return signal and said reference signal; and
   power management circuitry configured to:
      in absence of said power-up signal, not power said radar level gauge circuit to provide said level output, and
      in presence of said power-up signal, power said radar level gauge circuit to provide said level output.

2. The radar level gauge system according to claim 1, further comprising storage means for storing a preset threshold value of frequency separation variation, and wherein said frequency separation evaluation circuit is configured to generate said power-up signal when a variation of said frequency separation is smaller than a predefined threshold value.

3. The radar level gauge system according to claim 1, wherein said frequency separation evaluation circuit is connected to said frequency regulator, and arranged to determine said frequency separation based on a condition of said frequency regulator.

4. The radar level gauge system according to claim 3, wherein said frequency regulator comprises a comparator for providing an error signal indicative of a difference between a current frequency separation and said frequency separation set-point, and wherein said frequency separation evaluation circuit is arranged to generate said power-up signal when said error signal is below said predefined threshold value.

5. The radar level gauge system according to claim 1, wherein said frequency generating circuitry comprises at least one voltage controlled oscillator.

6. The radar level gauge system according to claim 1, further comprising a two-wire control loop, for providing power to said radar level gauge circuit.

7. The radar level gauge system according to claim 1, without any connection to any remote power supply, and comprising an internal power store as only means to provide power to said radar level gauge circuit.

8. A radar level gauge system according to claim 1, wherein said frequency separation evaluation circuit and said power management circuitry are comprised in a single low power circuit separate from said radar level gauge circuit.

9. The radar level gauge system according to claim 8, wherein said low power circuit is one of a stand-alone low power FPGA solution and a micro control unit.

10. The radar level gauge system according to claim 1, wherein said frequency separation evaluation circuit is configured to be inactive during measurements by the radar level gauge circuit.

11. The radar level gauge system according to claim 1, wherein said power management circuitry provides power to said radar level gauge circuit for a plurality of consecutive measurements each time a power-up signal is present.

12. The radar level gauge system according to claim 1, wherein pulses in said transmit signal and pulses in said reference signal are DC pulses.

13. The radar level gauge system according to claim 1, wherein said radar level gauge circuit comprises:
   circuitry for frequency modulating pulses in said transmit signal and pulses in said reference signal, and
   a mixer for mixing said return signal with said reference signal, to provide a tank signal.

14. The radar level gauge system according to claim 13, wherein said radar level circuit further comprises a band-pass filter for filtering a mixer output, and wherein said predefined frequency range is selected such a frequency content of said mixer output lies within a pass band of said band-pass filter.

15. A method for measuring the distance to a surface of a material contained in a tank, said method comprising the steps of:
   generating a first clock frequency and a second clock frequency;
   controlling a frequency separation between the first and second clock frequencies towards a frequency separation set-point;
   generating a power-up signal when said frequency separation is within a predefined frequency range;

in absence of said power-up signal, not powering a radar level gauge circuit; and in presence of said power-up signal, powering said radar level gauge circuit, thereby enabling the radar level gauge circuit to:

generate a transmit signal in the form of a pulse train with a transmit pulse repetition frequency based on said first clock frequency, generate a reference signal in the form of a pulse train with a reference pulse repetition frequency based on said second clock frequency, transmit said transmit signal towards said surface, receive a return signal caused by a reflection of said transmit signal at said surface, provide a level output based on a relationship between said return signal and said reference signal.

16. The method according to claim 15, wherein the power-up signal is generated based on a condition of said step of controlling said separation frequency.

17. The method according to claim 16, wherein said condition is an error signal indicative of a difference between a current frequency separation and said frequency separation set-point.

18. The method according to claim 15, further comprising:

storing a preset threshold value of a frequency separation variation, and generating said power-up signal when a variation of said frequency separation is smaller than said threshold value.

19. The method according to claim 15, wherein said steps of generating first and second clock frequencies and controlling a frequency separation are only performed when no transmit signals are transmitted.

20. The method according to claim 15, wherein said radar level gauge circuit is powered only from an internal power store.

21. A method for powering a radar level gauge configured to provide a level output, comprising:

an initial frequency stabilization procedure, ensuring a stable separation frequency between a first and a second clock frequencies, during which frequency stabilization procedure said radar level gauge is not powered to provide said level output, and a subsequent measurement cycle, performed only when a stable separation frequency has been established, during which said radar level gauge is powered to provide said level output.

* * * * *